United States Patent
Edakunni et al.

(10) Patent No.: US 11,127,100 B2
(45) Date of Patent: Sep. 21, 2021

(54) SYSTEMS AND METHODS FOR REAL-TIME SCHEDULING IN A TRANSPORTATION SYSTEM BASED UPON A USER CRITERIA

(71) Applicant: Conduent Business Services, LLC, Dallas, TX (US)

(72) Inventors: Narayanan Unny Edakunni, Bangalore (IN); Kaushik Baruah, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 590 days.

(21) Appl. No.: 15/459,091

(22) Filed: Mar. 15, 2017

(65) Prior Publication Data
US 2018/0268510 A1   Sep. 20, 2018

(51) Int. Cl.
*G06Q 50/30* (2012.01)
*H04W 64/00* (2009.01)
*G06Q 10/06* (2012.01)

(52) U.S. Cl.
CPC ....... *G06Q 50/30* (2013.01); *G06Q 10/06312* (2013.01); *H04W 64/00* (2013.01)

(58) Field of Classification Search
None
See application file for complete search history.

(56) References Cited

U.S. PATENT DOCUMENTS

| | | | | |
|---|---|---|---|---|
| 5,604,676 A | * | 2/1997 | Penzias | G06Q 10/047 |
| | | | | 705/417 |
| 2012/0022901 A1 | * | 1/2012 | Nasr | G06Q 10/02 |
| | | | | 705/5 |
| 2016/0219151 A1 | * | 7/2016 | McArdle | H04M 3/5235 |
| 2017/0059334 A1 | * | 3/2017 | Mukherjee | G01C 21/34 |
| 2018/0033018 A1 | * | 2/2018 | Opalka | G06Q 30/016 |
| 2020/0135026 A1 | * | 4/2020 | Miyajima | G06Q 50/10 |

* cited by examiner

*Primary Examiner* — Alan Torrico-Lopez
(74) *Attorney, Agent, or Firm* — Jones Robb, PLLC (57) ABSTRACT

Systems and methods for allocating resources in a transportation system are disclosed. A vehicle of the transportation system may be dispatched by one or more processors; first and second portions of the vehicle are allocated to first and second groups of users. A parameter of the first group of users may be tracked at a first location. Part of the second portion of the vehicle may be reallocated to the first group of users, in real-time, when the tracked parameter of the first group of users exceeds a threshold.

20 Claims, 5 Drawing Sheets

SYSTEMS AND METHODS FOR REAL-TIME SCHEDULING IN A TRANSPORTATION SYSTEM BASED UPON A USER CRITERIA

TECHNICAL FIELD

The present disclosure relates generally to a public transportation system. More particularly, the presently disclosed embodiments are related to systems and methods for real-time scheduling of vehicles and end-users along dispatch routes in a public transportation system based on generation of a dispatch schedule and various user-defined criteria.

BACKGROUND

Typically, transport agencies determine fixed (or pre-defined) schedules for dispatch of vehicles along one or more routes based on, for example, historical usage demand. The dispatch of such vehicles along the routes may be scheduled by the transport agencies such that public demands (e.g., which may change based on various parameters) at pick-up locations on the routes are met. Transport agencies schedule vehicles to stop at pick-up locations along the dispatch routes based on the fixed dispatch schedules in an effort to provide services to end-users without discrimination. Because, in most scenarios, public demand for transport services is not constant, fixed schedules for dispatching vehicles along the routes may not be sufficient to cater to variances in public demand. Thus, when demand for transport services is higher than supply, the quality and/or frequency of transport services offered by the transport agencies suffers. In one instance, degraded transport services may affect (or disrupt) certain end-users in a disproportionate manner. For example, degraded transport services can inconvenience end-users who depend on reliable and/or timely transport services such as commuters. Routine disruptions resultant from degraded transport services may encourage end-users, who would otherwise use public transport services, to switch to private transport services for their commutes, increasing overall traffic congestion. Therefore, there is a need for a robust system and method to manage routes and end-users and further schedule or prioritize end-users in such a manner that end-users are discouraged from using private transport services.

SUMMARY

In accordance with various exemplary embodiments illustrated herein, systems and methods for managing real-time scheduling for dispatch of vehicles along one or more routes of a public transportation system are described. In one instance, for example, a first dispatch schedule for vehicles of the transport system may be generated at one or more time instants by one or more processors based on a first demand for vehicles of the transport system at one or more pick-up locations (e.g., stops, stations, etc.) along the dispatch routes. A first group of end-users of the transport system are prioritized based on one or more parameters by the one or more processors; the one or more processors may track the one or more parameters. When the tracked parameter(s) of the first group of end-users of the transport system exceeds a threshold, the first dispatch schedule is updated, in real-time, by the one or more processors.

In another instance, resources of a public transportation system may be allocated to end-users in real-time. For example, vehicles of the transport system may be dispatched along one or more routes of the transport system in real-time by one or more processors; a first portion and a second portion of each of the dispatched vehicles may be allocated to a first group of end-users and a second group of end-users, respectively. A parameter of the first group of end-users of the transport system may be tracked at a first location along the one or more routes of the transport system by the one or more processors. When the tracked parameter of the first group of end-users exceeds a threshold, a part of the second portion of the (or group of) vehicle(s) 130 may be re-allocated, in real-time, to the first group of end-users of the transport system.

In yet another instance, end-users of the public transportation system may be prioritized for pick-up at one or more locations along the dispatch routes of the transport system in real-time. Data associated with a first parameter at a first location along the dispatch route(s) may be collected by the one or more processors. A number of end-users at the first location may be tracked by the one or more processors. When the collected data exceeds predefined constraints of the public transport system, a group of the number of end-users at the first location along the dispatch route may be prioritized and additional resources of the transport system may be allocated to the prioritized group of end-users.

In another instance, a system for real-time scheduling of vehicles along dispatch routes of the public transportation system is described. For example, one or more processors of a processing node of the system may be configured to generate a first dispatch schedule for one or more vehicles of the transport system. A first group of end-users of the transport system may be prioritized over (or with respect to) a second group of end-users of the transport system based on a set criteria; the set criteria may be associated with one or more parameters associated with the first group of end-users, the second group of end-users, and/or the public transport system. The one or more parameters may be tracked and, when the tracked parameters exceed a set threshold, the first dispatch schedule for the one or more vehicles of the transport system may be updated in real-time.

In another instance, the public transportation system may be configured to allocate resources to one or more groups of end-users. The transport system can include, for example, one or more processors configured to: dispatch vehicle(s) 130 of the transport system along a pre-defined dispatch route, where first and second portions of the vehicle are allocated to the one or more groups of end-users; track, at a first location along the pre-defined dispatch route, a parameter of a prioritized group of the one or more groups of end-users; and, dynamically re-allocate the first and second portions of the vehicle, in real-time, based on the tracked parameter of the prioritized group of end-users.

In yet another instance, a system for prioritizing end-users of the public transport system comprises one or more processors configured to: collect data associated with a first parameter at a first location along a dispatch route of the public transport system; track a number of end-users waiting for pick-up at the first location; prioritize a group of the number of end-users at the first location along the dispatch route when the collected data exceeds predefined constraints of the public transport system; and, allocate additional resources of the public transport system to the prioritized group of end-users.

Additional objects and advantages of the present disclosure will be set forth in part in the description which follows, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure, as claimed.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

References to "one embodiment," "at least one embodiment," "an embodiment," "one example," "an example," "for example," and so forth are used to indicate that embodiment(s) or example(s) may include a particular feature, structure, characteristic, property, element, and/or limitation. But, not every embodiment or example necessarily includes that particular feature, structure, characteristic, property, element, and/or limitation. Furthermore, repeated use of the phrase "in an embodiment" does not necessarily refer to the same embodiment.

Definitions: The following terms and/or words have, for the purposes of this application, the meanings as set forth below:

A "computing device" may refer to a device that includes: one or more processor(s), microcontroller(s), and/or any other electronic component; a device; or a system that performs one or more operations according to one or more programming instruction(s) and/or code(s). Examples of the computing device may include, but are not limited to, for example, a desktop computer, a laptop, a personal digital assistant (PDA), a mobile device, a Smartphone, a tablet computer (e.g., iPad® and Samsung Galaxy Tab®), and the like.

A "transportation system" and/or "transport system" refers to a transportation network that includes one or more vehicles configured to be dispatched along one or more routes. In an embodiment, the transportation network may keep track and/or monitor demands associated with the one or more dispatch routes. Further, the transportation network may keep track and/or monitor end-user or other traffic associated with the one or more dispatch routes. The transportation system can be further configured to manage and/or maintain infrastructure along the one or more dispatch routes. In an embodiment, the transportation system may be configured as, for example, a public transportation system, a freight logistic system, a commercial shared ride services system, a private transportation system, or any combination thereof.

A "vehicle" refers to a method or mode for transport of one or more individuals and/or cargos between two or more locations along a route. In an embodiment, a group of one or more individuals and/or cargos may share the vehicle. In an embodiment, the one or more vehicles may be configured as, but not limited to, for example, a bus, a truck, a car, a ship, an airplane, or the like and any combination thereof.

A "count of vehicles" refers to a number of vehicles operated by and/or controlled by a transportation agency in a transportation system. For example, in an embodiment, a transportation agency A has two-hundred buses; thus, the count of total vehicles of the transportation agency A is two-hundred. A count of vehicles may also refer to a number of vehicles of the transportation agency that are currently deployed and/or traversing along the one or more dispatch routes. For example, in an embodiment, transportation agency A has two-hundred buses. Out of the two-hundred buses, one-hundred and fifteen buses are currently deployed or traversing along the one or more dispatch routes; thus, the count of total vehicles currently deployed and/or traversing along the one or more dispatch routes is one-hundred and fifteen. A count of vehicles may also refer to a number of vehicles of the transportation agency that are currently inactive (i.e., currently not operating), but which vehicles may be scheduled to operate along the one or more dispatch routes in the future. For example, in an embodiment, transportation agency A has two-hundred buses. Out of the two-hundred buses, one-hundred and fifteen buses are currently deployed and/or traversing along the one or more dispatch routes; thus, eighty-five vehicles are inactive and may be scheduled to operate along the one or more dispatch routes in the future based on, for example, end-user or other demand.

A "route" and/or "dispatch route" refers to a path (predefined and/or defined in real-time) that may be traversed by one or more vehicles to pick-up or drop-off one or more individuals and/or cargos at locations along the dispatch routes. In an embodiment, the route(s) may include a set of "S" stations configured in a predetermined and/or defined order. The route(s) can further include one or more pair(s) of stations, which pair(s) of stations include at least one source station and at least one destination station. For example, in an embodiment, a city bus travels from Harlem to the East Village in New York City, N.Y. The city bus may travel through, for example, $4^{th}$ Avenue, Madison Avenue, and $5^{th}$ Avenue. Thus, the path that the city bus is operated on and/or travels along from Harlem to the East Village is a dispatch route, where Harlem operates as the source station and the East Village operates as the destination station.

A "schedule" refers to a plan or scheme for carrying out an activity or an event during or at a predefined time period and/or instance. In an embodiment, the scheduling of a vehicle along a dispatch route corresponds to a predefined time duration during which time duration the vehicle traverses along the dispatch route. In another embodiment, schedule refers to a time instance at which point in time a vehicle is deployed from and/or leaves a source station (i.e., starts) or has to reach a destination station (i.e., arrives). For example, a city bus may be scheduled to travel along a dispatch route (e.g., Harlem to the East Village) at each of one or more time instances such as, for example, 9:00 AM, 9:30 AM, 10:00 AM, etc.

A "commuter" refers to an individual who may avail him/herself of a transport facility to commute (or traverse) between pair(s) of stations located along one or more dispatch routes. In an embodiment, the commuter sends a travel request using a computing device associated with him/her. Further, the commuter may pay incentive(s) in exchange for use of the transport facility. Hereinafter, "commuter," "traveler," "rider," "requestor," "passenger," and/or "end-user" may be interchangeably used to describe an individual who avails him/herself of a transport facility of the transportation system.

A "demand" refers to a request that may be initiated by one or more individuals availing him/herself of a transport facility of the transportation system, which demand corresponds to a travel request between pair(s) of stations located along one or more dispatch routes. In an embodiment, the demand may be determined based on at least a historical usage demand, a pre-booked demand, and/or a real-time demand. Hereinafter, "demand," "need," "request," and/or "requirement" may be interchangeably used to describe an initiated request by one or more individuals availing him/herself of a transport facility of the transportation system.

An "alternative path or route" refers to a directed path such that a vehicle may follow the directed path between pair(s) of stations located along one or more dispatch routes. For example, in an embodiment, two or more paths (e.g., a first path and a second path such that the first path is shorter than the second path) may exist for traveling between a source station and a destination station of the transportation system. Along the first path, the demands or requests initiated by individuals availing themselves of a transport facility of the transportation system may be ten demands; the demands or requests along the second path may be eight demands. In an embodiment, a vehicle may take at least thirty minutes to travel along the first path and at least ten minutes to travel along the second path; the vehicle may be required to reach the destination station in at most twenty minutes. In such a case, the vehicle may be scheduled to travel along the second path. Thus, the second path is considered an alternative path or route to the first path for the vehicle, which second path is selected as a prioritized route for the vehicle based on a maximum time period to reach the destination station. In another embodiment, the alternative path or route may be selected based on at least a demand associated with the path. For example, there are two paths (e.g., a first path and a second path) for traveling between a source station and a destination station. Along the first path, the demands or requests initiated by individuals availing themselves of a transport facility of the transportation system may be seventy demands; the demands or requests along the second path may be thirty demands. A vehicle may take at least thirty minutes to travel along the first path and at least fifteen minutes to travel along the second path; the vehicle may be required to reach the destination station in at most twenty minutes. But, the revenue, which is earned by scheduling the vehicle to travel along the first path exceeds the revenue earned by scheduling the vehicle to travel along the second path. In such a case, the vehicle may be scheduled to travel along the first path; thus, the first path is considered an alternative path or route to the second path for the vehicle, which first path is selected as a prioritized route for the vehicle based on maximum revenue.

A "capacity of a vehicle" refers to a maximum number of individuals that may be accommodated in a vehicle when the vehicle is empty. In an embodiment, the capacity of the vehicle corresponds to a maximum number of permissible vacancies in the vehicle. Thus, the capacity of the vehicle may correspond to a total number of seats in the vehicle. For example, a city bus can accommodate forty-five commuters; thus, the capacity of a city bus is forty-five.

A "tolerance time" refers to a time duration and/or time period up to which an individual (e.g., a commuter) may wait for a vehicle at a station located along a dispatch route for travel between pair(s) of stations along a dispatch route of the transportation system. For example, in an embodiment, commuter A requests a bus for travel from a source station to a destination station along a first dispatch route at 10:30 AM. In the request, commuter A indicates (or further specifies) that he/she will wait for the requested bus until 10:40 AM. Thus, the tolerance time associated with commuter A is ten minutes.

A "fare" refers to an amount or sum of currency, which may be charged to a commuter and that corresponds to travel between pair(s) of stations along a dispatch route on a vehicle. In an embodiment, the fare may be charged when, for example, an individual is traveling along a dispatch route of the transportation system and/or a cargo is being transported from one location to another location along the dispatch route. For example, a first commuter A may board a bus from a first station; the first commuter A requests transportation to a second station. The first commuter A may be charged USD 5 for travel from the first station to the second station. In such a case, USD 5 is the fare of the bus for traveling from the first station to the second station. Hereinafter, "fare," "tariff," "fee," or "charge" are interchangeably used.

A "service level" refers to a percentage of commuter(s) experiencing wait-times within a threshold. For example, a percentage of commuter(s) served within one minute of arrival, two minutes of arrival, etc., may be computed. Service levels may be tracked across different groups of commuter(s) (e.g., high priority commuter(s), low priority commuter(s), etc.) and across different price levels (e.g., full-fare commuter(s), discounted-fare commuter(s), etc.).

Figure 1A:
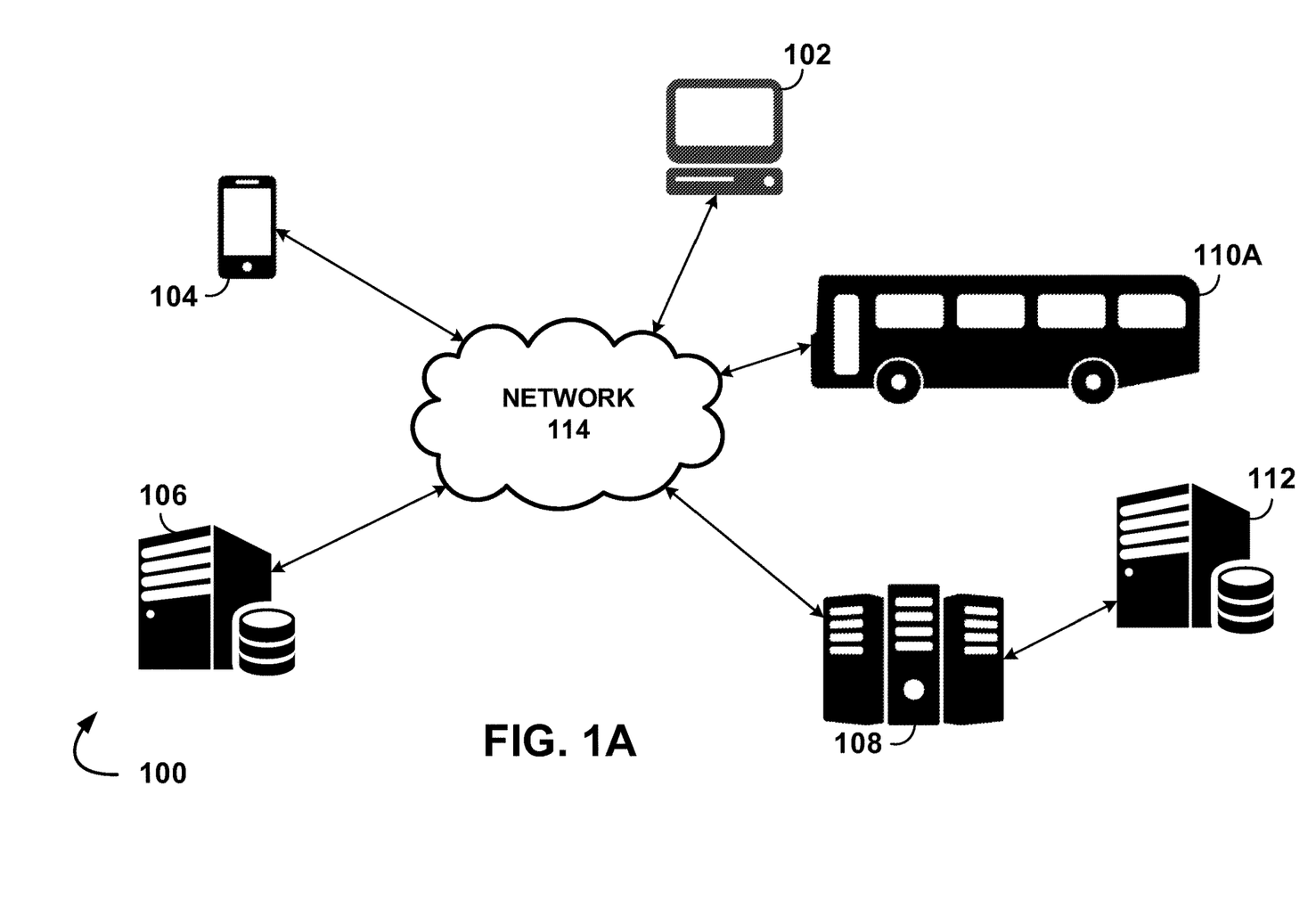
FIG. 1A is a block diagram illustrating a system environment in accordance with the present disclosure.

FIG. 1A is a block diagram of a system environment 100 in accordance with various embodiments of the present disclosure. As illustrated in FIG. 1A, the system 100 includes a transport manager-computing device 102, a commuter-computing device 104, a database server 106, an application server 108, a vehicle-computing device 110A, and a network 114; the application server 108 may be communicatively coupled with traffic control server 112. Various devices in the system environment 100 may be interconnected with each other over network 114. FIG. 1A shows, for simplicity, one transport-manager computing device 102, one commuter-computing device 104, one database server 106, one application server 108, and one vehicle-computing device 110. However, a person having ordinary skill in the art would understand that the embodiments disclosed herein may also be implemented using multiple transport manager-computing devices, multiple commuter-computing devices, multiple database servers, multiple application servers, and multiple vehicle-computing devices without departing from the scope of the disclosure.

The transport manager-computing device 102 may be a computing device that includes one or more processors and/or one or more memories. The memorie(s) may include computer-readable code(s) and/or instructions executable by the one or more processors to perform predetermined operations. In an embodiment, the transport manager-computing device 102 may be used by an end-user (e.g., an employee of a transportation agency such as a public or private transportation system) operating and/or managing vehicle(s) of the transportation system along one or more dispatch routes. In an embodiment, the end-user uses the transport manager-computing device 102 to input information of the vehicle(s) of the transportation agency. For example, information of the vehicle(s) can include: a count of total vehicles, a count of vehicles currently in operation, a capacity of each vehicle(s), expected revenue, a fare scheme, etc. In an embodiment, the transport manager-computing device 102 transmits information of the vehicle(s) to database server 106 and/or application server 108. The end-user can also use the transport manager-computing device 102 to provide one or more inputs to database server 106 and/or application server 108. For example, the one or more inputs can include: a determination of demand(s) along the one or more dispatch route(s), a selection of a set of route(s) from the one or more dispatch route(s), a confirmation or rejection of the demand(s), etc.

In an embodiment, the end-user of the transport manager-computing device 102 can use, for example, a graphical user interface (GUI) on the transport manager-computing device 102 to view and/or edit a dispatch schedule for vehicle(s) at one or more time instances along the dispatch route(s). Further, the end-user of the transport manager-computing device 102 can use the dispatch schedule to prepare a travel roster and/or manage various travel related logistics associated with the vehicle(s). For example, the end-user of the transport manager-computing device 102 can coordinate with crew(s) of the vehicle(s) to schedule the vehicle(s) and/or to inform the crew(s) of dispatch schedule changes associated with the vehicle(s).

In an embodiment, the transport manager-computing device 102 may correspond to one or more of, but not limited to, a desktop computer, a laptop, a PDA, a mobile device, a Smartphone, a tablet computer, etc.

The commuter-computing device 104 may be a computing device that includes one or more processors and/or one or more memories. The memorie(s) may include computer-readable code(s) and/or instructions executable by the one or more processors to perform predetermined operations. In an embodiment, the commuter-computing device 104 may be used by a requestor (e.g., a commuter, a traveler, a passenger, etc.) who may wish to avail him/herself of a transport facility to commute between pair(s) of stations along dispatch route(s) of the transport system. The commuter may use a GUI on the commuter-computing device 104 to provide information of his/her travel schedule along a dispatch route(s). For example, information of the commuter's travel schedule may include: a source station, a destination station, a time instance at which the commuter may expect a vehicle at the source station, and a tolerance time up to which the commuter may wait for the vehicle at the source station. The commuter-computing device 104 may transmit information of the commuter's travel schedule as a travel request (e.g., a demand) to the transport manager-computing device 102, the database server 106, and/or the application server 108 over transportation network 114. Further, in an embodiment, the commuter may use the commuter-computing device 104 to cancel and/or edit a pending travel request. In an embodiment, the commuter-computing device 104 may receive a notification message that pertains to the travel request from the transport manager-computing device 102 and/or the application server 108 over network 114. The notification message may be indicative of at least a confirmation and/or a rejection of the travel request and/or a detail of the vehicle, which vehicle may be scheduled along the dispatch route in response to the travel request.

In an embodiment, the commuter-computing device 104 may correspond to one or more of, but not limited to, a desktop computer, a laptop, a PDA, a mobile device, a Smartphone, a tablet computer, etc.

A person having ordinary skill in the art would understand that the embodiments disclosed herein are not limited to use of the commuter-computing device 104 by a single commuter. In an embodiment, for example, the commuter-computing device 104 may be used by multiple commuters, which multiple commuters transmit (or send) one or more travel request(s) to the transport manager-computing device 102, the database server 106, and/or the application server 108 over network 114.

The database server 106 may be a computing device, which may be communicatively coupled over the network 114. The database server 106 stores travel requests received from the commuter-computing device 104. The travel requests (or demands) may correspond to pre-booked demands and/or real-time demands, which demands are raised by requestor(s). The pre-booked demands are travel requests requested (or booked) in advance (i.e., travel requests prior to a date and/or specified time instant of travel) by the requestor(s). For example, in an embodiment, a first commuter raises a travel request at 5:00 PM on May 20, 2017. The travel request may correspond to travel from a first source station to a second destination station located at a point along a first dispatch route at 10:30 AM on May 21, 2017. The travel request raised by the first commuter is a pre-booked travel request and may correspond to (or be calculated as part of) a pre-booked travel demand. The real-time demands are travel requests requested (or booked) in advance (i.e., travel requests booked at least before a predefined time period and/or specified time instant on a date of travel) by the requestor(s). For example, in an embodiment, a second commuter raises a travel request at 9:00 AM on May 20, 2017. The travel request may correspond to travel from a first source station to a second destination station located at a point along a first dispatch route at 10:45 AM on May 20, 2017. The travel request raised by the first commuter is a real-time travel request and may correspond to (or be calculated as part of) a real-time travel demand.

Further, the database server 106 stores historical demand(s) of the requestor(s). In an embodiment, the historical demand(s) may include demands of the requestor(s), which may have been addressed and/or dealt with in the past. For example, a historical demand associated with a first commuter can include information such as a travel pattern associated with the first commuter and/or a frequency with which and a time of travel the first commuter typically requests travel between pair(s) of stations. The historical demand may further include a log of time instances at which the requestor(s) may have travelled in the past. The log of time instances may be indicative of at least a sign-in and/or a sign-out associated with each requestor(s). In an embodiment, the log of time instances may be extracted from databases electronic ticketing system(s) and/or from other transportation agencies.

The database server 106 stores information associated with the dispatch route(s). For example, information associated with a particular dispatch route may include: a source station and a destination station of the dispatch route, one or more sub-stations positioned at predefined locations between the source station and the destination station, an expected (or real-time) traffic congestion on the dispatch route at various time instance(s) throughout a day, a fare charged for traveling between pair(s) of stations, an expected cost of operating a vehicle along the dispatch route(s), etc. The database server 106 may also store information associated with vehicle(s) of the transportation network 114. For example, information associated with vehicle(s) of the transportation network 114 may include: a count of vehicle(s) and a capacity of the vehicle(s). Further, the database server 106 may store salary details of crew(s) associated with each of the vehicle(s).

In an embodiment, the database server 106 may be configured to transmit (or receive) instructions, queries, information, etc., to/from device(s) such as the transport manager-computing device 102, the commuter-computing device 104, the application server 108, and/or the vehicle-computing device 110 over transportation network 114. In an embodiment, the database server 106 may receive a query from the application server 108 to retrieve the historical demand(s), the pre-book demand(s), the real-time demand(s), and/or information associated with the dispatch route(s) and/or vehicle(s) of the transportation network 114. For querying the database server 106, querying language(s) such as, but not limited to, SQL, QUEL, OMX and so forth may be used. Further, the database server 106 may be realized through various technologies such as, but not limited to, Microsoft® SQL server, Oracle, and My SQL.

The application server 108 may be a computing device and/or a software framework that provides a generalized approach for creating an application-server 108 implementation. In an embodiment, the functionalities of the application server 108 may be dedicated to the efficient execution of procedures such as, but not limited to, programs, routines, or scripts stored in memorie(s) at various device(s) of the transportation network 114 for supporting its applied applications. The application server 108 may receive and/or extract information associated with the dispatch route(s) and/or vehicle(s) of the transportation network 114. Further, the application server 108 may receive input(s) from the transport manager-computing device 102. Thereafter, the application server 108 sends a query to database server 106, which database server 106 is used to extract the historical demand(s), the pre-book demand(s), the real-time demand(s), and/or information associated with the dispatch route(s) and/or vehicle(s) of the transportation network 114. The application server 108 may determine demand(s) along the dispatch route(s) at multiple time instance(s) based on, for example, the historical demand(s), the pre-book demand(s), the real-time demand(s), and/or information associated with the dispatch route(s) and/or vehicle(s) of the transportation network 114.

The application server 108 may also determine a set of constraints, the set of constraints being associated with the transportation agency. For example, the application server 108 may use an Integer Learning Programming (ILP) technique and/or a Greedy algorithm technique to determine a count of vehicle(s) that may be scheduled to traverse along dispatch route(s) of the transportation network 114. In an embodiment, the application server 108 displays the scheduling of the vehicle(s) on a GUI of the transport manager-computing device 102. Further, in another embodiment, the application server 108 transmits information that pertains to the scheduling of vehicle(s) to vehicle-computing device 110, which vehicle-computing device 110 may be associated with the vehicle(s).

The application server 108 is realized through various types of application servers such as, but not limited to, Java application server, .NET framework application server, and a Base4 application server. In one embodiment, the functionalities of the database server 106 are integrated into the application server 108.

A person having ordinary skill in the art would understand that the embodiments disclosed herein are not limited to use of the application server 108 and the transport manager-computing device 102 as separate entities. For example, in an embodiment, the application server 108 may be realized as an application hosted on or running on the transport manager-computing device 102 without departing from the disclosure.

The vehicle-computing device 110 may be a computing device including one or more processors and/or one or more memories. The memorie(s) may include computer-readable code(s) and/or instructions executable by the one or more processors to perform predetermined operations. In an embodiment, each vehicle in the transportation network 114 may include a vehicle-computing device 110. The vehicle-computing device 110 may include, for example, a navigation device with built-in GPS sensors. Further, the memorie(s) of the vehicle-computing device 110 may store information that pertains to a map of a geographical area in which the vehicle(s) traverse along dispatch route(s) of the transportation network 114. In an embodiment, the vehicle-computing device 110 may present a map of the geographical area, which map may graphically illustrate pre-defined dispatch route(s) on which route(s) the vehicle(s) traverse between pair(s) of stations. In addition, the vehicle-computing device 110 may display a notification message to an end-user. For example, the notification message may correspond to a scheduling of the vehicle(s) along a pre-defined (or current) dispatch route(s) of the vehicle(s). In an embodiment, an operator (or end-user) of a vehicle(s) of the transportation network 114 uses the vehicle-computing device 110 to view the notification message and, thereafter, accepts and/or rejects a transmitted schedule. Examples of the operator (or end-users) of a vehicle(s) of the transportation network 114 may include, but are not limited to: an individual driving a vehicle, an individual navigating the vehicle, and/or an individual coordinating a dispatch route of the vehicle, etc.

In an embodiment, the vehicle-computing device 110 may correspond to a variety of computing devices such as, but not limited to, a desktop computer, a laptop, a PDA, a mobile device, a Smartphone, a tablet computer, etc.

The transportation network 114 may correspond to any medium through which content and/or messages flow between a variety of computing devices of system environment 100 (e.g., the application server 108, the database server 106, the transport manager-computing device 102, the commuter-computing device 104, and/or the vehicle-computing device 110, etc.). Examples of the transportation network 114 may include, but are not limited to, a Wireless Fidelity (Wi-Fi) network, a Wireless Area Network (WAN), a Local Area Network (LAN), and/or a Metropolitan Area Network (MAN). Various computing devices in the system environment 100 can connect to the transportation network 114 in accordance with various wired and wireless communication protocols such as Transmission Control Protocol and Internet Protocol (TCP/IP), User Datagram Protocol (UDP), and 2G, 3G, or 4G communication protocols.

Figure 1B:
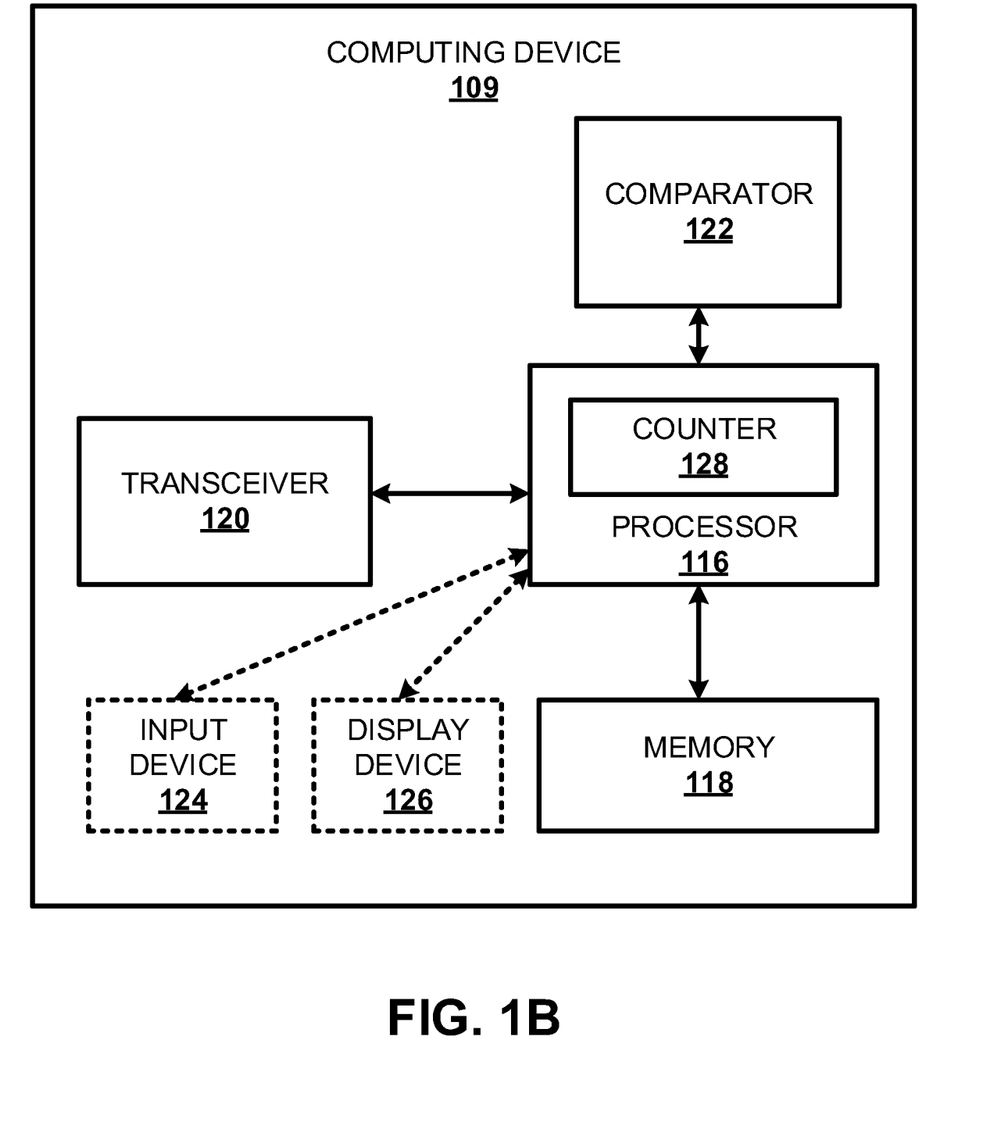
FIG. 1B is a block diagram illustrating a computing device for scheduling vehicle(s) along dispatch route(s) of a transportation network in accordance with the present disclosure.

FIG. 1B is a block diagram illustrating a computing device for scheduling vehicle(s) along dispatch route(s) of a transportation network in accordance with the present disclosure. In an embodiment, the computing device(s) 109 for scheduling vehicle(s) 130 along dispatch route(s) of public transportation network 114 may be configured as transport manager-computing device 102, commuter-computing device 104, database server 106, application server 108, vehicle-computing device 110A, etc.

The computing device(s) 109 may include, for example, processor(s) 116, memorie(s) 118, transceiver(s) 120, comparator(s) 122, input device(s) 124, and display device(s) 126 as illustrated in FIG. 1B. The transceiver 120 can be connected to transportation network 114 through (or via) an input terminal (not shown) and/or an output terminal (not shown).

In an embodiment, the processor(s) 116 may be configured to execute set(s) of instructions stored at memorie(s) 118, which processor 116 may be coupled to the memory 118, transceiver 120, comparator 122, input device 124, display device 126, and/or the counter 128. The processor 116 can include an arithmetic logic unit (not shown) and/or a control unit (not shown). The arithmetic logic unit (ALU) may be coupled to the control unit. The ALU may be configured to perform one or more mathematical and/or logical operations and the control unit may control the operation of the ALU. Further, the processor 116 can include counter(s) 128. The computing device(s) 109 may use the counter 128 to determine a count of vehicle(s) 130. Although the counter 128 is depicted as being implemented within the processor 116, a person having ordinary skill in the art would understand that the counter 128 can be implemented independently from the processor 116 without departing from the scope of the disclosure. The processor 116 may execute one or more set(s) of instructions, programs, codes, and/or scripts stored at the memory 118 of the computing device(s) 109 to perform the one or more mathematical and/or logical operations. Examples of the processor 116 may include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 118 may be operable to store machine code(s) and/or computer program(s), which machine code(s) and/or computer program(s) include at least one code section executable by processor 116. The memory 118 may store the set(s) of instructions executable by the processor 116. In an embodiment, the memory 118 includes buffer(s) (not shown). The buffer(s) are configured to store, for example, the historical demand(s), the pre-book demand(s), the real-time demand(s), and/or information associated with the dispatch route(s) and/or vehicle(s) 130 of the transportation network 114. In addition, the buffer(s) can store information associated with set(s) of constraints and/or other information associated with the vehicle(s) 130. Examples of the memory 118 may include, but are not limited to, a random access memory (RAM), a read-only memory (ROM), a hard disk drive (HDD), and/or a secure digital (SD) card. In an embodiment, the memory 118 may include machine code(s) and/or computer program(s) that are executable by the processor 116 to perform specific operations. A person having ordinary skill in the art would understand that instruction(s) stored at memory 118 may enable hardware of the computing device(s) 109 to perform predetermined operations.

The transceiver 120 may be operable to communicate with the multiple device(s) such as the transport manager-computing device 102, the commuter-computing device 104, and/or the vehicle-computing device 110. In addition, the transceiver 120 may be operable to communicate with multiple server(s) such as database server 106 and/or a traffic control server 112 over transportation network 114. The transceiver 120 can receive and/or transmit demand(s) associated dispatch route(s) of the public transportation network 114 and/or information associated with, for example, vehicle(s) 130 traversing along the dispatch route(s) to/from, using various device(s) of the system environment 100 (e.g., the database server 106, the transport manager-computing device 102, the commuter-computing device 104, and/or the vehicle-computing device 110) over the transportation network 114 through input and/or output terminals (not shown). Examples of the transceiver 120 include, but are not limited to, an antenna, an Ethernet port, a USB port, and/or any other port that can be configured to receive and/or transmit data. The transceiver 120 may be configured to receive and/or transmit historical demand(s), the pre-book demand(s), the real-time demand(s), and/or information associated with the dispatch route(s) and/or vehicle(s) 130 of the transportation network 114 as well as information associated with set(s) of constraints and/or other information associated with the vehicle(s) 130 using, for example, notification message(s) in accordance with various communication protocols, such as, TCP/IP, UDP, 2G, 3G, and/or 4G communication protocols, etc., through input and/or output terminal(s) (not shown).

The comparator 122 can be configured to compare at least two input signals to generate an output signal. In an embodiment, the generated output signal may correspond to a binary number such as "1" or "0." The comparator 122 may generate output signal "1" if a value of a first signal of the at least two input signals is greater than a value of a second signal of the at least two signals. Similarly, the comparator 122 may generate an output signal "0" if a value of the first signal is less than a value of the second signal. In an embodiment, the comparator 122 may be configured using software and/or hardware technologies. Moreover, while the comparator 122 is depicted as being implemented independent of/from the processor 116 in FIG. 1B, a person having ordinary skill in the art would understand that the comparator 122 may be implemented within the processor 116 without departing from the scope of the disclosure.

The input device 124 may include logic, circuitry, interface(s), and/or code(s) operable to receive input(s) from, for example, an end-user, requestor, etc. of the transportation network 114. The input device 124 may be operable to communicate with the processor 116. Examples of the input devices 124 include, but are not limited to, a touch screen, a keyboard, a mouse, a joystick, a microphone, a camera, a motion sensor, a light sensor, and/or a docking station.

The display device 126 may include logic, circuitry, interface(s), and/or code(s) operable to render a display. In an embodiment, the display device 126 is configured as, for example, a Cathode Ray Tube (CRT) based display, Liquid Crystal Display (LCD), Light Emitting Diode (LED) based display, Organic LED display technology, and/or Retina display technology. In addition, in an embodiment, the display device 126 may be capable of receiving input(s) from an end-user, requestor, etc. For example, the display device 126 may be configured as a touch screen that enables the end-user, requestor, etc., to provide input(s) to device(s) of the public transportation network 114. In an embodiment, the touch screen may be configured as, for example, a resistive touch screen, capacitive touch screen, and/or a thermal touch screen. In yet another embodiment, the display device 126 may be configured to receive input(s) through, for example, a virtual keypad, a stylus, a gesture, and/or touch based input.

Figure 1C:
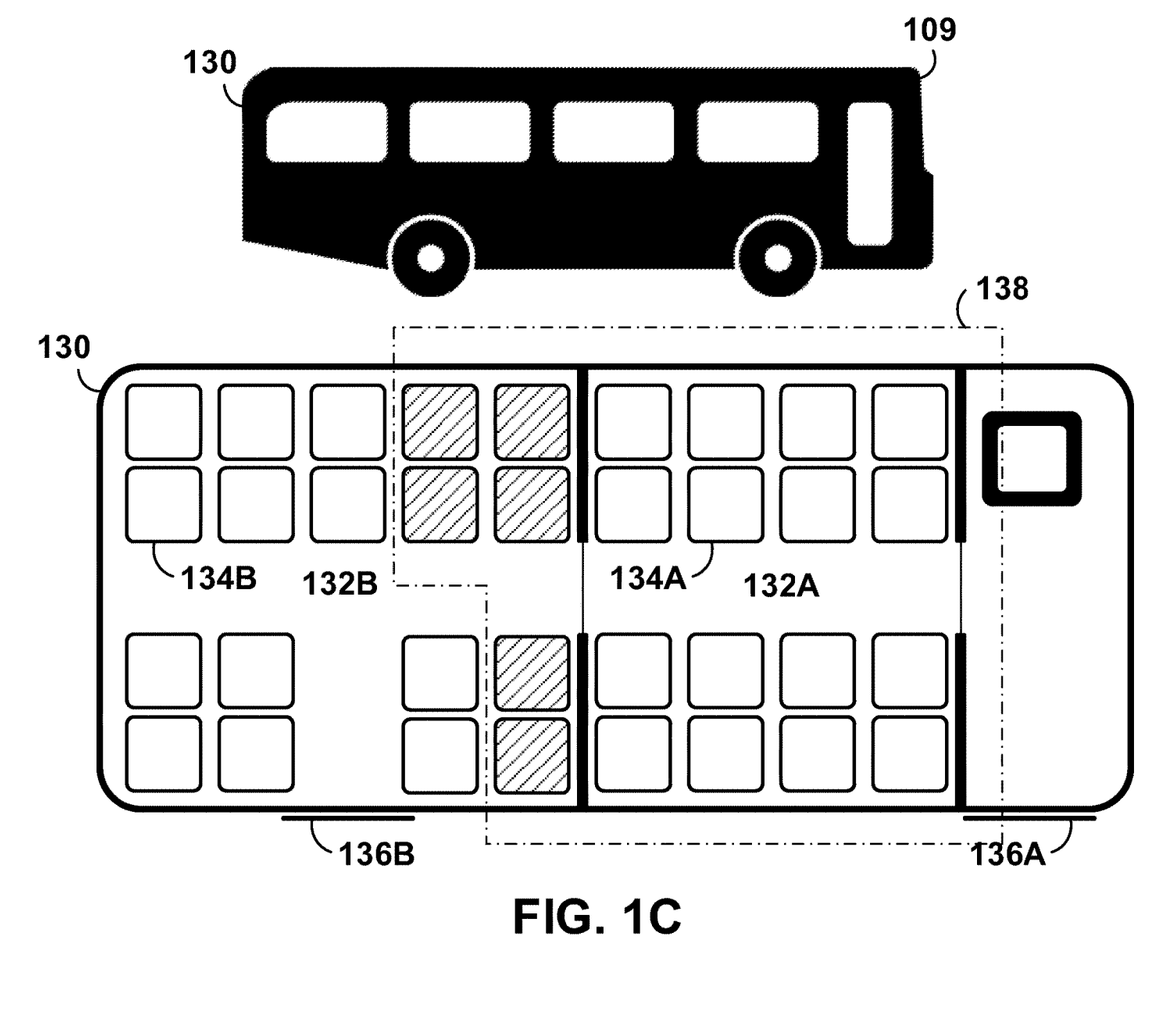
FIG. 1C is a schematic diagram illustrating a vehicle of the transportation network in accordance with the present disclosure.

FIG. 1C is a schematic diagram illustrating a vehicle of the transportation network in accordance with the present disclosure, which vehicle includes a vehicle-computing device (discussed with reference to FIGS. 1A and 1B). As illustrated in FIG. 1C, vehicle(s) 130 may have a vehicle-computing device 110 and multiple points of entry 136A, 136B for commuters (not shown), which points of entry and/or exit 136A, 136B may be assigned based on a type of service (or service level) required by commuter(s). Points of entry and/or exit 136A, 136B to the vehicle 130 may be assigned to commuter(s) based on, for example, price differentiation and/or ranking criterion. For example, in an embodiment, a first point of entry and/or exit 136A to the vehicle 130 can be configured to serve full-fare paying commuters (e.g., business travelers commuting to work) and a second point of entry and/or exit 136B to the vehicle 130 can be configured to serve discounted-fare paying commuters (e.g., tourists and/or leisure travelers).

The transportation network 114 may track a number of commuter(s) waiting at, for example, a first pick-up location (e.g., a bus stop enclosure) along a dispatch route(s) of the transportation network 114 and a wait-time (or tolerance time) threshold associated with each commuter at computing device(s) 109 (e.g., transport manager-computing device 102, commuter-computing device 104, database server 106, application server 108, and/or vehicle-computing device 110) of the transportation network 114. The transportation network 114 can use the computing device(s) 109 to dispatch additional vehicle(s) 130 along scheduled dispatch route(s) such that a maximum number of full-fare paying commuter(s) can be served within the wait-time threshold (e.g., 5 minutes). In an embodiment, if the full-fare paying commuter is served within the associated wait-time threshold (e.g., 5 minutes) for that commuter, the full-fare paying commuter is charged a full-fare price for transport between pair(s) of stations of the transportation network 114. If, however, the full-fare paying commuter is not served within the associated wait-time threshold (e.g., 5 minutes) for that commuter, the price of transport between pair(s) of stations for the full-fare paying commuter may be reduced to a discounted-fare price. If, however, the commuter is a discounted-fare commuter, the discounted-fare commuter is charged a discounted-fare price regardless of a wait-time threshold at, for example, a first pick-up location along a dispatch route(s). In this manner, the public transport agency of transportation network 114 can plan services such that full-fare (or high fare) paying commuter(s) are served faster compared to (or are prioritized over) discounted-fare (or low fare) paying commuter(s).

Various parameters may be implemented (or tuned) at the computing device(s) 109 (e.g., transport manager-computing device 102, commuter-computing device 104, database server 106, application server 108, and/or vehicle-computing device 110) of the transportation network 114 such as, for example, a time to start a vehicle(s) 130, a determination as to whether full-fare (or high fare) and/or other prioritized commuter(s) should be picked-up at a pick-up location along a scheduled dispatch route(s) of the transportation network 114, and/or a determination as to whether discounted-fare (or low fare) and/or other de-prioritized commuter(s) should be picked-up at a pick-up location along a scheduled dispatch route(s) of the transportation network 114. In an embodiment, if the transport agency of transportation network 114 implements a parameter at the computing device(s) 109 such that full-fare or prioritized commuter(s) and/or discounted-fare or de-prioritized commuter(s) are not picked-up at a pick-up location along a scheduled dispatch route(s) of the transportation network 114, the public transport agency of transportation network 114 may still instruct a crew member of the vehicle 130 to drop-off commuter(s) (or other passengers) on-board the vehicle(s) 130 at desired drop-off location(s) along the scheduled dispatch route(s) of the transportation network 114. For example, the vehicle(s) 130 may include separate points of entry and/or exit 136A, 136B such that commuter(s) willing to disembark the vehicle(s) 130 are able to exit at desired drop-off location(s) along scheduled dispatch route(s). In an alternative embodiment, the public transport agency of the transportation network 114 may advertise specific pick-up and/or drop-off location(s) along scheduled dispatch route(s) to commuter(s) at a display located on the vehicle(s) 130 and/or via computing device(s) 109 of the transportation network 114.

Figure 2:
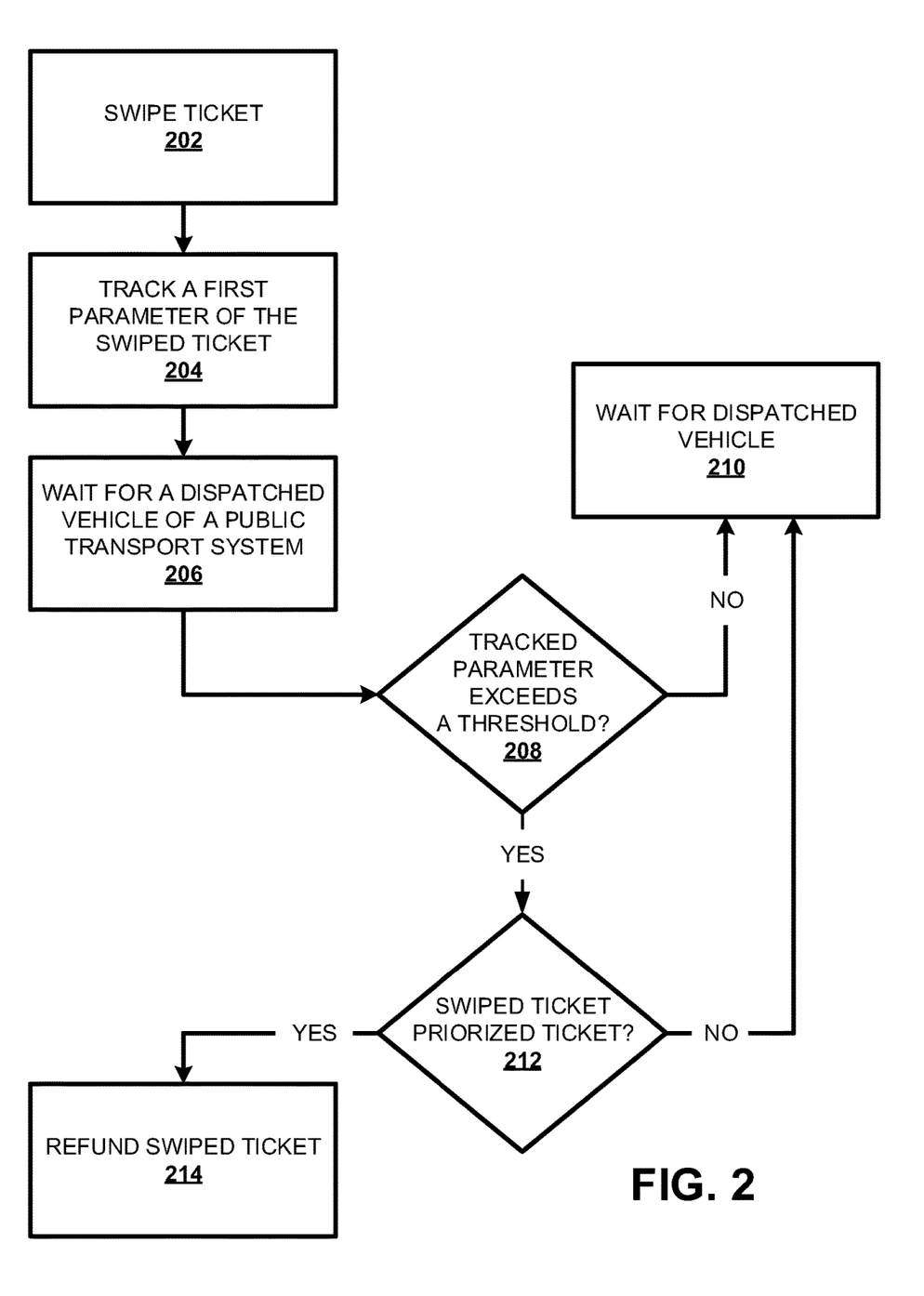
FIG. 2 is a flow diagram illustrating a method for managing real-time scheduling of a vehicle of a transportation network in accordance with the present disclosure.

FIG. 2 illustrates a flow diagram depicting an exemplary embodiment for managing real-time scheduling of a vehicle of a transportation network in accordance with the present disclosure. The exemplary method for managing real-time scheduling of a vehicle illustrated in FIG. 2 can be implemented in the exemplary system environment 100 illustrated in FIG. 1A, in the exemplary computing device(s) 109 illustrated in FIG. 1B, using the exemplary vehicle(s) 130 illustrated in FIG. 1C, or with any suitable vehicle(s) of and/or transportation system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Public transport agencies schedule vehicle(s) 130 to stop at pick-up locations along dispatch route(s) using dispatch schedule(s) to provide public transport services to commuter(s) without discrimination. When demand for transport services is higher than supply, the quality and/or frequency of transport services offered by the public transport agencies can suffer. In some instances, degraded transport services may affect (or disrupt) certain end-users in a disproportionate manner. For example, delayed transport services can inconvenience commuter(s) who depend on reliable and/or timely transport services. Routine disruptions that result from degraded transport services may encourage commuter(s) who typically avail him/herself of the public transport services to switch to private transport services for their commutes, increasing overall city traffic. It is, therefore, advantageous to discourage use of private transport services by personalizing public transport service options using, for example, dispatch and/or end-use prioritization schemes, which schemes can be altered in real-time.

Static and dynamic scheduling is used to improve operational efficiencies of public transport agencies. For example, public transport agencies can optimize the operational performance of the transportation system to guarantee a maximum percentage of commuter(s) who experience disruptions (e.g., wait times) above a threshold by, for example, considering constraints of vehicle(s) 130 (e.g., bus) capacity and/or availability in the transportation system. But, the guaranteed percentage only applies when the transport agencies are able to execute a dispatch schedule meticulously. Often, this is not possible due to, for example, variability in traffic conditions and/or commuter(s) demand. Dynamic planning, which perturbs set dispatch schedule(s), can be used to address variability in traffic conditions and/or commuter(s) demand such that various performance indices of the delayed transport services are addressed. But, existing schema does not consider or cater to specific groups or classes of commuter(s) or rank commuter(s) based on, for example, an associated level of (or perceived) disruption.

In an exemplary embodiment, method(s) for allocating resource(s) in a public transportation system can be provided. The method(s) can include dispatching, by one or more processors, vehicle(s) 130 of a public transport agency of the transportation system; first and second groups of seats of the vehicle(s) 130 can be allocated to ranked groups of commuter(s). For instance, the public transport agency may differentiate first and second groups of seats of the vehicle(s) 130 based on a desired level of vehicle(s) 130 service, which services can be based on time-of-day, number of stops, fare price, assigned versus unassigned compartments, time-of-arrival (e.g., faster buses/trains), tolerance time, etc. Traditionally, all commuter(s) waiting at a pick-up location or stop experience similar wait times; the current embodiment ranks groups of commuter(s) (e.g., full-fare commuter(s), discounted-fare commuter(s), leisure commuter(s), etc.) and can plan vehicle 130 services such that the public transport agency services various ranked groups of commuter(s) faster than others. For example, the public transport agency can assign portions of the first and second groups of seats of the vehicle(s) 130 to commuter(s) based on commuter rank; parameters of the highest-ranked group of commuter(s) can be tracked (e.g., using one or more processors) at a first pick-up location; that is, the public transport agency can track a wait-time (or tolerance time) associated with each commuter of the highest-ranked group of commuter(s) waiting at the first pick-up location and an estimated time-of-arrival for an inbound vehicle(s) 130. Based on the tracked wait-time (or tolerance time), the public transport agency can dispatch additional vehicle(s) 130 to service the highest-ranked group of commuter(s) within a predetermined time threshold (e.g., five minutes); the public transport agency can also re-allocate, in real-time, seats of the second group of seats of the inbound vehicle(s) 130 originally allocated to lower-ranked group(s) of commuter(s) to commuter(s) in the highest-ranked group of commuter(s).

Referring to FIG. 2, at steps 202 and 204, the public transport agency may allocate first and second groups of seats 132A, 132B of the vehicle 130 to commuter(s) of the public transportation network 114 based on a rank of the commuter(s). Commuter(s) of the public transportation network 114 are ranked when, for example, swiping a smart card (or ticket) upon entering a pick-up location or stop enclosure (not shown) at a first station of pair(s) of stations located along dispatch route(s) of the public transportation network 114; each pick-up location enclosure, similar to the vehicle(s) 130 illustrated in FIG. 1C, can have multiple entry and/or exit points, which entry and/or exit points are each configured to offer varying plan services to meet demand(s) (e.g., performance, services, time tolerance, etc.) of differently ranked groups of commuter(s) (e.g., full-fare commuter(s), discounted-fare commuter(s), leisure commuter(s), etc.). Swipes from the smart card(s) (or tickets) at one or more of the multiple entry and/or exit points of the pick-up location and/or stop enclosure are tracked (or communicated) to a processor of a processing node of one or more computing device(s) 109 of the public transportation network 114, for example, processor 116 of computing device(s) 109 illustrated in FIG. 1B.

In an exemplary embodiment, commuter(s) are required to swipe a smart card while entering a bus stop enclosure (or train platform) at different entry and/or exit points; the bust stop enclosure may have multiple entry and/or exit points based on a type of service required by the commuter(s). For example, one entry and/or exit point can be configured to serve full-fare paying commuter(s) (e.g., business travelers commuting to work) and the other entry and/or exit point can be configured to serve discounted-fare paying commuter(s) (e.g., tourists and/or leisure travelers). As the commuter(s) swipe their smart card upon entering the bus stop enclosure, the swipes are immediately communicated to a control center (e.g., computing device(s) 109 of the public transport agency and/or public transportation network 114 such as transport manager-computing device 102, commuter-computing device 104, database server 106, application server 108, and/or vehicle-computing device 110). The control center tracks a number of commuter(s) waiting at the bus stop enclosure for pick-up by vehicle(s) 130 of the transport agency of the transportation system and an amount-of-time (i.e., an elapsed time period) each of the commuter(s) has been waiting for pick-up by vehicle(s) 130 at the bus stop enclosure.

At steps 206-214, the public transport agency of public transportation network 114 via computing device(s) 109 (e.g., transport manager-computing device 102, commuter-computing device 104, database server 106, application server 108, and/or vehicle-computing device 110) dispatches vehicle(s) 130 along scheduled dispatch route(s) of the public transport system based on the tracked parameter(s) of the highest-ranked group of commuter(s). For example, upon swiping a smart card (or ticket) at a pick-up location along the dispatch route(s), data associated with the swipe (e.g., time-instant of swipe, wait-time, entry and/or exit point, etc.) can be monitored by one or more processors (e.g., processor 116 of computing device(s) 109) of public transportation network 114 such that the public transport agency tracks vehicle(s) 130 wait-time for each commuter(s) of the highest-ranked group of commuter(s) waiting at the pick-up location. The public transport agency of public transportation network 114 may use the monitored (or collected) data to perform varying functions, for example: refund a portion (or full amount) of a fare to commuter(s) of the highest-ranked group of commuter(s) who are not picked up at the pick-up location(s) before a tolerance time expires, effect dispatch of additional vehicle(s) 130, in real-time, to the pick-up location, and/or reallocate 138 seats 134A, 134B of a dispatched (or inbound) vehicle(s) 130 originally allocated to lower-ranked group(s) of commuter(s) to commuter(s) in the highest-ranked group of commuter(s).

For example, the public transport agency of the public transportation network 114 can reallocate 138 seats 134A, 134B of the second group of seats 132B of the dispatched (or inbound) vehicle(s) 130 to commuter(s) in the highest-ranked group of commuter(s) by instructing crew members (not shown) of the dispatched vehicle(s) 130 to refuse entry (or not pick-up) at least a portion of the lower-ranked commuter(s) waiting at the pick-up location for the dispatched vehicle(s) 130; commuter(s) currently on the dispatched vehicle(s) 130 can disembark from the inbound vehicle 130 at the pick-up location. The public transport agency of the public transportation network 114 reallocates 138 seats 134A, 134B of the second group of seats 132B of the vehicle(s) 130 originally allocated to the lower-ranked group of commuter(s) to commuter(s) in the highest-ranked group of commuter(s) to decrease, for example, a wait-time of the commuter(s) of the highest-ranked group of commuter(s).

In an embodiment, a control center (e.g., computing device(s) 109 of the public transport agency and/or public transportation network 114 such as transport manager-computing device 102, commuter-computing device 104, database server 106, application server 108, and/or vehicle-computing device 110) dispatches buses such that a maximum number of full fare paying commuter(s) are served within a service time threshold (e.g., before a tolerance time expires such as 5 mins). If, for example, the high paying commuter(s) or full fare paying commuter(s) are served within the time threshold, then they are charged the full-fare price otherwise the high paying commuter(s) are charged the discounted-fare price. On the other hand, the commuter(s) using a discounted-fare swipe card (or ticket) are charged the discounted-fare price regardless of wait-time of the commuter(s) at the bus enclosure or stop for the bus. The transport agency of the public transportation system can consider, via the control center, various parameters to ensure the best service level(s) for commuter(s) while improving revenue such as: the time to start a bus, whether or not to pick-up high priority commuter(s) at a bus stop or not, and whether or not to pick-up low priority commuter(s) at a bus stop or not.

Figure 3:
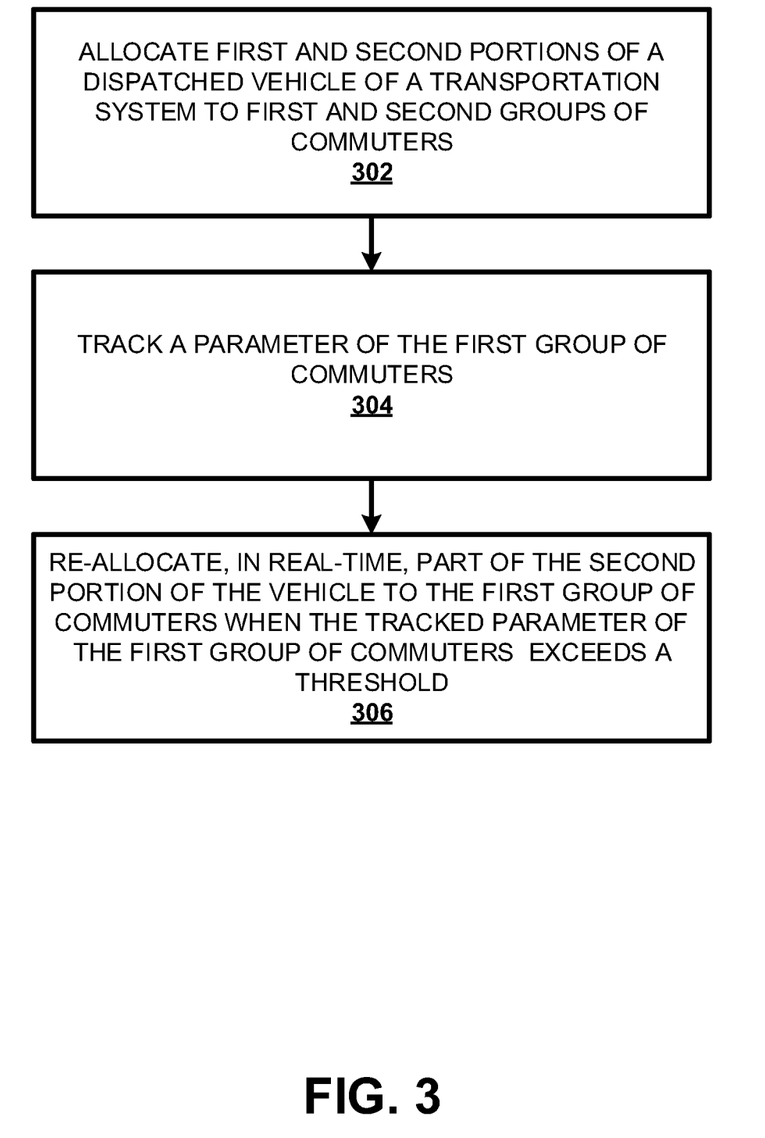
FIG. 3 is a flow diagram illustrating a method for allocating resources in a transportation network in accordance with the present disclosure.

FIG. 3 illustrates flow chart depicting an exemplary method for allocating resources in a transportation network in accordance with the present disclosure. The exemplary method for allocating resources illustrated in FIG. 3 can be implemented in the exemplary system environment 100 illustrated in FIG. 1A, in the exemplary computing device(s) 109 illustrated in FIG. 1B, using the exemplary vehicle(s) 130 illustrated in FIG. 1C, or with any suitable vehicle(s) of and/or transportation system. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

In an embodiment, a mathematical model may be formulated to provide a schedule of vehicle(s) 130 configured to serve commuter(s) of the public transportation system differentially and in a manner to maximize revenue earned from servicing those commuter(s). For example, a static schedule which assumes that a demand distribution for each of multiple price classes (e.g., full-fare commuter(s), discounted-fare commuter(s), leisure travelers, etc.) can be estimated reliably such that a schedule in-sync with demand(s) can be generated an used to meet the service needs (or requirements) of each of the multiple price class commuter(s) on the average. The static schedule, which is obtained by solving an ILP discussed with reference to FIG. 1B, may be adapted to a dynamic one using various techniques.

Referring to FIG. 3, at 302, the public transport agency of the public transportation network 114 can collect data associated with a first parameter at a first location. In an embodiment, the public transport agency using computing device(s) 109 (e.g., transport manager-computing device 102, commuter-computing device 104, database server 106, application server 108, and/or vehicle-computing device 110) of the public transportation network 114 can calculate demand(s) (or travel requests) generated by commuter(s) located at a first pick-up location along a scheduled dispatch route(s) based on various parameters.

For example, high priority demand $x_{d,t}^{h}$ of type $d \in D$ served at time t. The total demand served within $w_{max}$ would be:

$$x_d = \Sigma_{t=t_d}^{w_{max}} x_{d,t}^{l} + x_{d,t}^{h}, \qquad (1)$$

where the total demand served would be less than a total demand for type d:

$$x_d \leq n_d \; \forall d \in \qquad (2)$$

Here, $n_d$ represents the expected demand to arrive at time $t_d$, and $n_d$ may be computed as an average of demand(s) of commuter(s) over, for example, consecutive days from collected historical ticketing data.

Revenue obtained from different commuter(s) may be dependent on a number of commuter(s) served within $T_{max}$. For example, the total revenue that can be earned may be defined by a total number of commuter(s) who would be served and a corresponding revenue that those commuter(s) would contribute:

$$R = \Sigma_{d \in D}(\Sigma_{t=t_d}^{w_{max}} x_{d,t}^{l} r_l + \Sigma_{t=t_d}^{T_{max}} x_{d,t}^{h} r_l + \Sigma_{t=T_{max}}^{w_{max}} x_{d,t}^{h} r_{hl}) \qquad (3)$$

The total operational cost can be defined by a total distance traveled by the vehicle(s) 130 between pair(s) of stations along the dispatch route(s) of the public transportation network 114 in a day, as follows:

$$\Sigma_{b \in B} DD_b Y_b, \qquad (4)$$

wherein in a specific scenario where all the trips along the dispatch route(s) made by the vehicle(s) 130 are along a same dispatch route(s), the above equation may be simplified to include an index over the times of scheduled departure from a source (or origin) station t. For example, because the distances are the same, the distance may be dropped from the cost function as follows:

$$\sum_{t \in T} Y_t$$

The total number of vehicle(s) 130 in transit (or traversing) in transportation network 114 at any given point of time may be less than a total number of vehicle(s) 130 of the public transport agency of the transportation network 114, which may be represented as follows:

$$\Sigma_{t' \in [t-RTT, \ldots, t]} Y_{t'} \leq m \; \forall t \in T \qquad (5)$$

The number of commuter(s) can be accommodated at a single vehicle(s) 130 can be enforced at any given time period (or instant), which can be limited by c. Before the capacity constraint c is defined, intermediate variables may be introduced. For example, the total number of commuter(s) boarding at a pick-up location (or source station) s at time t can be defined as $P_{boarding}^{h}(s,t)$ and $P_{boarding}^{l}(s,t)$ irrespective of their destination:

$$P_{boarding}^{h}(s,t) = n_d^{l} - \Sigma_{d|s=s_d} x_{d,t}^{h} \qquad (6)$$

$$P_{boarding}^{l}(s,t) = n_d^{l} - \Sigma_{d|s=s_d} x_{d,t}^{l} \qquad (7)$$

where the notation $d|s=s_d$ stands for all demand d wherein the pick-up location (or source station) s is. $c_{effective}(s,t)$ operates as the effective capacity of the vehicle(s) 130 arriving at pick-up location s at time t, where s operates as the source station of demand d:

$$c^h_{effective}(s, t) = cY_{t|t=TD_{(s_0,s)}} - \sum_{d \in D|s \in [s_d,e_d] \cap t'=t-TD_{(s_d,s)}} x_{(d,t')} \quad (8)$$

The number of high priority commuter(s) waiting at a pick-up location s at time t can be defined as $n_{waiting}^h(s,t)$ where:

$$n_{waiting}^h(s,t) = n_d^h - \Sigma_{d|s=s_d} \Sigma_{t'=t_d} x_{d,t'}^h \quad (9)$$

Constraints on the number of commuter(s) boarding the vehicle(s) 130 can be based on a capacity of the vehicle(s) 130, which is defined as:

$$P_{boarding}^h(s, t) = \begin{cases} \min(c^h_{effective}(s, t), n^h_{waiting}(s, t)) \\ 0 \quad 0.w \end{cases} \quad (10)$$

if $l_{b,s}^h = 1$, where $P_{boarding}^h(s,t)$ denotes a number of high priority commuter(s) boarding at pick-up location s at time t. Similar constraints may also be defined for low priority commuter(s). For example, it may be assumed that both low priority and high priority entry and/or exits 136A, 136B at the vehicle(s) 130 and/or at, for example, a bus enclosure stop are to be opened; thus, the high priority entry and/or exit 136A may be opened first and then the low priority entry and/or exit 136B. Accordingly, the following constraints exist:

$$P_{boarding}^l(s, t) = \begin{cases} \min(c^l_{effective}(s, t), n^l_{waiting}(s, t)) \\ 0 \quad 0.w \end{cases} \quad (11)$$

if $l_{b,s}^l = 1$,
where:

$$c^l_{effective}(s, t) = c^h_{effective}(s, t) - P^h_{boarding}(s, t) \quad (12)$$

$$n^l_{waiting}(s, t) = n_d^l - \sum_{d|s \in d} \sum_{t'=t_d} x_{d,t'}^l$$

where $x_{d_s,t}^h$ are the number of high priority commuter(s) who boarded the vehicle(s) 130 at a first pick-up location (or source station) s at time t. The conditional constrains given in equations (11) and (12) above can be used in an ILP by defining intermediate variables q∈[0,1] and r∈[0,1], which can be defined further as:

$$q^h(s, t) = \frac{n^h_{waiting}(s, t) - c_{effective}(s, t)}{M}, \quad (13)$$

where M is a large number such that −1≤q≤1 and $$q^h(s,t) > 0 \text{ when } n_{waiting}^h(s,t) > c_{effective}(s,t) \quad (14)$$

$$q^h(s,t) < 0 \text{ when } n_{waiting}^h(s,t) < c_{effective}(s,t) \quad (15)$$

where r is defined as:

$$q^h(s,t) \le r^h(s,t) \le q^h(s,t)+1 \quad (16)$$

which ensures that:

$$r^h(s,t) = 1 \text{ when } n_{waiting}^h(s,t) > c_{effective}(s,t) \quad (17)$$

$$r^h(s,t) = 0 \text{ when } n_{waiting}^h(s,t) < c_{effective}(s,t) \quad (18)$$

Using the variables, the conditional constraints may be defined as:

$$P_{boarding}^h(s,t) \ge -M(1-l_{b,s}^h) - (1-r^h(s,t)) + c_{effective}^h(s,t) \quad (19)$$

$$P_{boarding}^h(s,t) \le M(1-l_{b,s}^h) + (1-r^h(s,t)) + c_{effective}^h(s,t) \quad (20)$$

$$P_{boarding}^h(s,t) \ge -M(1-l_{b,s}^h) - Mr^h(s,t) + n_{waiting}^h(s,t) \quad (21)$$

$$P_{boarding}^h(s,t) \le M(1-l_{b,s}^h) + Mr^h(s,t) + n_{waiting}^h(s,t) \quad (22)$$

$$P_{boarding}^h(s,t) \le Ml_{b,s}^h, \quad (23)$$

where equations (13) and (23) can be repeated for low priority commuter(s) demand(s) as well.

The calculations assume that commuter(s) are willing to wait indefinitely at a pick-up location(s), which implies that all demand(s) from the commuter(s) will be met by the vehicle(s) 130 running in the transportation network 114, which is illustrated as follows:

$$\Sigma_{t \in [t_d, \ldots, T]} x_{d,t} = n_d \, \forall d \in D \quad (24)$$

Where there exists a limit on a maximum wait time (e.g., time tolerance) of commuter(s), the quality is replaced by the inequality as follows:

$$\Sigma_{t \in [t_d, \ldots, \min(t_d+w_{max},T]} x_{d,t} \le n_d \, \forall d \in D \quad (25)$$

The public transport agency may implement restrictions on a range of the variables. For example, for $x_{d,t}$ variables, the variables may be non-zero only when $t > t_d$, as follows:

$$x_{d,t} = 0 \, \forall t < t_d, d \in D \quad (26)$$

$$x_{d,t} \ge 0 \, \forall t \in T, d \in D \quad (27)$$

$$x_{d,t} = 0 \, \forall t > \min(t_d + w_{max}, T), d \in D, \quad (28)$$

where the last inequality holds for the case when there is a maximum threshold on the wait time (e.g., time tolerance) of commuter(s).

Based on the variables and constraints defined above with respect to equations (1)-(28), the objective function of the ILP used to determine a desired static schedule may be defined mathematically. For example, the objective function may be used to maximize revenues without incurring large operational costs. Revenues may be maximized by formulating the objective function as a weighted combination of: (i) the average revenue earned, and (ii) a number of vehicle(s) 130 trips made, which we minimize using the ILP. Specifically, the objective function of the ILP may be defined as follows:

$$\text{Minimize } \alpha \Sigma_{t \in T} Y_t - \beta R, \quad (29)$$

which function is subject to the constraints defined at equations (2), (5)-(7), (10), (11), and (19)-(23). Here α≥0 and β≥0 are parameters, which parameters may be chosen as required by the transport agency to trade-off between an operational cost and generated revenue. Input parameter(s) discussed above in relation to equations (1)-(29) may be defined as follows:

| Input parameters | |
| --- | --- |
| m | Number of vehicle(s) available |
| c | Commuter capacity of each vehicle(s) |
| n | Number of pick-up and/or drop-off locations (e.g., stations or stops) in the transportation network |
| S | Set of pick-up and/or drop-off locations (e.g., stations or stops) with $|S| = n$ |
| $\Delta$ | Discrete time buckets into which demand(s) are grouped |
| T | Set of time buckets [1 ... T] |
| $s_d$ | Source station (e.g., pick-up location) for a set of commuter(s) |
| $e_d$ | Destination station (e.g., drop-off location) for the same set of commuter(s) |
| $t_d$ | The time when the commuter(s) arrived at the pick-up location (e.g., stations or stops) |
| $n_d$ | The number of commuter(s) with $s_d$, $e_d$, and $t_d$ |
| $h_d^h$ | The number of high priority commuter(s) amongst $n_d$ commuters |
| $n_d^l$ | The number of low priority commuter(s) amongst $n_d$ commuters |
| $d: (s_d, e_d, t_d, n_d)$ | Characterizations of a demand pattern |
| D | Set of demand(s) (d) as measured by averaging over historical data |
| $s_b$ | Start pick-up location (e.g., start station, source station) for a trip |
| $e_b$ | Final drop-off location (e.g., stop station, destination station) for a trip |
| $t_b$ | Time the vehicle(s) are scheduled to start from $s_b$ |
| $b: (s_b, e_b, t_b,)$ | Characterizations representing a trip |
| $I_{b,h,s}$ | Indicator variable denoting if the vehicle(s) picks up high priority commuter(s) at station s |
| $I_{b,l,s}$ | Indicator variable denoting if the vehicle(s) picks up low priority commuter(s) at station s |
| B | Set of trips (b) |
| $TD_{i,j}$ | The travel time from stop i to stop j |
| $DD_b$ | The total travel distance for a trip b |
| RTT | Round Trip Time of a vehicle(s) on a dispatch route(s) |
| RTD | Round Trip Distance of a vehicle(s) on a dispatch route(s) |
| Variables | |
| $x_d$ | The expected number of commuter demand(s) corresponding to $d \in D$ that is served by the proposed solution; $x_d \in \{0, n_d\}$ |
| $x_{d,t}^l$ | The expected number of low priority commuter(s) demands corresponding to $d \in D$ who have been served at time t where $t \geq t_d$ |
| $x_{d,t}^h$ | The expected number of high priority commuter(s) demands corresponding to $d \in D$ who have been served by the proposed solution at time t |
| $Y_b$ | The number of vehicle(s) that run or traverse along a dispatch route(s) and schedule corresponding to $b \in B$; the total number of vehicle(s) in the transportation system is m, $Y_b \in \{0, m\}$ |
| $T_{max}$ | The maximum wait time after which the high priority commuter(s) are refunded a portion of their fare (e.g., where high priority commuter(s) are charged a discounted-fare price) |
| $r_h$ | The price paid by high priority commuter(s) |
| $r_l$ | The price paid by low priority commuter(s) |
| $r_{hl}$ | The price paid by high priority commuter(s) who have not been served within the time tolerance $T_{max}$ |
| $w_{max}$ | The maximum wait time until which any commuter(s) (e.g., high priority commuter(s) and/or low priority commuter(s)); assumes that after waiting for $w_{max}$ time the commuter(s) leave to find alternative transport |

At steps 304 and 306, based on the variables and conditional constraints discussed above, the public transport agency of transportation network 114 generates high priority and low priority demand(s) associated with first and second groups of commuter(s) at pick-up location(s) along dispatch route(s) of the transportation network 114. The transport agency via computing devices (e.g., transport manager-computing device 102, commuter-computing device 104, database server 106, application server 108, and/or vehicle-computing device 110) uses the generated demand(s) to track a number of commuter(s) in the first group of commuter(s) and a number of commuter(s) in the second group of commuter(s). Based on the tracked first and second groups of commuter(s), the transport agency generates demand data, which data is used to create a dynamic schedule for dispatching vehicle(s) 130 along a simulated or newly generated dispatch route(s) of the transportation network 114.

For example, in an embodiment, based on the newly generated dispatch route(s) of the transportation network, vehicle(s) 130 of the public transport agency can be instructed to stop at specific pick-up location(s) along the generated dispatch route(s) and, based on demand data, open and/or close entry and/or exit doors of the vehicle(s) 130 such that a predefined number of commuter(s) belonging to the first and/or second groups of commuter(s) are allowed to board and/or disembark to/from the vehicle(s) 130 at the pick-up location(s). If, for example, an entry and/or exit point of the vehicle 130 associated with the first group of commuters (e.g., high priority commuter(s), full-fare commuter(s), business traveler(s), etc.) is opened at a pick-up location along the generated dispatch route(s), the vehicle(s) 130 allows only commuter(s) of the first group of commuter(s) standing and/or located within, for example, a high priority bus stop enclosure to board the vehicle(s) 130. Similarly, if an entry and/or exit point of the vehicle(s) 130 associated with the second group of commuters (e.g., low priority commuter(s), discounted-fare commuter(s), leisure traveler(s), etc.) is opened at a pick-up location along the generated dispatch route(s), the vehicle(s) 130 allows only commuter(s) of the second group of commuter(s) standing and/or located within, for example, a low priority bus stop enclosure to board the vehicle(s) 130.

The public transport agency of the public transportation network 114 can reallocate 138 seats 134, 134B of the first and/or second groups of seats 132A, 132B of dispatched vehicle(s) 130 to commuter(s) based on demand(s) and/or revenue(s) by instructing crew members (not shown) of the vehicle(s) 130 to refuse entry (e.g., not pick-up or keep the doors closed) to at least a portion of, for example, low priority commuter(s) waiting at the pick-up location. For example, a number of seats 134B of the second group of seats 132B of the vehicle(s) 130 originally allocated to low priority commuter(s) may be reallocated 138 to high priority commuter(s) to decrease a wait-time for the high priority commuter(s) and or to increase revenue(s).

Potential and/or actual revenue generated based on, for example, the simulated or newly generated dispatch route(s) may be computed. For example, the operation of vehicle(s) 130 along various generated dispatch route(s) may be simulated based on sample demand(s) data. Revenue earned from differential pricing, illustrated above in equation (3), may be used to distribute the first and second groups of seats to high priority and/or low priority commuters.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A method of operating a transport system, the method comprising:
    sending over a network from a transport-manager computing device, by one or more transceivers, a dispatch schedule to a vehicle computing device of a vehicle associated with the transport system, the transport system comprising one or more vehicles, the vehicle computing device configured to receive the dispatch schedule, the dispatch schedule directing an operation of the vehicle;
    receiving over the network, by the one or more transceivers, data associated with one or more user parameters and one or more travel requests, a travel request comprising a source station and a destination station, from one or more commuter computer devices associated with a first group of users of the transport system and a second group of users of the transport system, wherein:
        the one or more user parameters comprise a wait tolerance period for each, and
        the one or more commuter computer devices are configured for:
            input of the one or more travel requests from the first and second groups of users through a graphic user interface (GUI),
            receipt, over the network from the transport-manager computing device, of one or more notifications responsive to the one or more travel requests, the one or more notifications indicating one or both of a confirmation and a rejection of the one or more travel requests, and
            display of the one or more notifications through the GUI;
    receiving over the network, by the one or more transceivers, data associated with one or more vehicle parameters from one or more vehicle computer devices comprising the vehicle computer device, wherein the one or more vehicle parameters comprise a user capacity of each vehicle, a quantity of vehicles, or a vehicle location of each vehicle, or any combination thereof;
    prioritizing, by one or more processors, the first group of users of the transport system over the second group of users of the transport system based on the one or more user parameters and the one or more vehicle parameters;
    tracking, by the one or more processors, the one or more user parameters, the one or more vehicle parameters, and the one or more travel requests;
    updating, in real-time and by the one or more processors, based on the priority of the first group over the second group, the dispatch schedule to generate an updated dispatch schedule, when the one or more user and vehicle parameters exceed a threshold, wherein the updated dispatch schedule differs from the dispatch schedule with respect to one or more of a route followed by the vehicle, a stop made by the vehicle, and a door actuation performed by the vehicle;
    sending over the network from the transport-manager computing device, by the one or more transceivers:
        the updated dispatch schedule to the vehicle computing device, the updated dispatch schedule directing a modification of the operation of the vehicle based on the prioritization of the first group over the second group, and
        the one or more notifications to the one or more commuter computer devices;
    de-prioritizing, by the one or more processors, a user of the first group of users after the wait tolerance period of the user elapses, wherein the de-prioritized user is assigned to the second group of users; and
    refunding at least a portion of a fare to the user.

2. The method of claim 1, wherein the first group of users comprise full-fare paying commuters.

3. A transport system, the system comprising:
a transport-manager computing device configured to:
send over a network, by one or more transceivers, a dispatch schedule to a vehicle computing device of a vehicle associated with the transport system, the transport system comprising one or more vehicles, the dispatch schedule directing an operation of the vehicle, and
send over the network, by the one or more transceivers:
an updated dispatch schedule to the vehicle computing device, the updated dispatch schedule directing a modification of the operation of the vehicle based on the prioritization of the first group over the second group, and
one or more notifications to one or more commuter computer devices; and
one or more processors configured to:
receive over the network, by the one or more transceivers, data associated with one or more user parameters and one or more travel requests, a travel request comprising a source station and a destination station, from the one or more commuter computer devices associated with a first group of users of the transport system and a second group of users of the transport system, wherein:
the one or more user parameters comprise a wait tolerance period for each user, and
the one or more commuter computer devices are configured for:
input of the one or more travel requests from the first and second groups of users through a graphic user interface (GUI),
receipt, over the network from the transport-manager computing device, of the one or more notifications responsive, the one or more notifications responsive to the one or more travel requests, the one or more notifications indicating one or both of a confirmation and a rejection of the one or more travel requests, and
display the one or more notifications through the GUI;
receive over the network, by the one or more transceivers, data associated with one or more vehicle parameters from one or more vehicle computer devices comprising the vehicle computer device, wherein the one or more vehicle parameters comprise a user capacity of each vehicle, a quantity of vehicles, or a vehicle location of each vehicle, or any combination thereof;
prioritize the first group of users of the transport system over the second group of users of the transport system based on the one or more user parameters and the one or more vehicle parameters;
track the one or more user parameters, the one or more vehicle parameters, and the one or more travel requests;
update, in real-time, based on the priority of the first group over the second group, the dispatch schedule when the one or more user and vehicle parameters exceed a threshold to generate the updated dispatch schedule, wherein the updated dispatch schedule differs from the dispatch schedule with respect to one or more of a route followed by the vehicle, a stop made by the vehicle, and a door actuation performed by the vehicle;
de-prioritize, by the one or more processors, a user of the first group of users after the wait tolerance period of the user elapses, wherein the de-prioritized user is assigned to the second group of users; and
refund at least a portion of a fare to the user.

4. The system of claim 3, wherein the first group of users comprise full-fare paying commuters.

5. The system of claim 3, wherein the first group of users is charged a higher fare than the second group of users.

6. The method of claim 1, wherein the dispatch schedule comprises a route and the updated dispatch schedule comprises an updated route.

7. The method of claim 1, further comprising modifying the operation of the vehicle to follow the updated dispatch schedule.

8. The method of claim 1, further comprising displaying a notification message to an operator of the vehicle, through the vehicle computing device, pertaining to the updated dispatch schedule.

9. The method of claim 1, further comprising:
sending over the network from the transport-manager computing device, by one or more transceivers, a second dispatch schedule to a second vehicle computing device of a second vehicle associated with the transport system, the second dispatch schedule directing a second operation of the second vehicle, wherein the dispatch schedule is a first dispatch schedule, the vehicle computing device is a first vehicle computing device, the vehicle is a first vehicle, and the operation is a first operation;
updating, in real-time and by the one or more processors, based on the priority of the first group over the second group, the second dispatch schedule to generate a updated second dispatch schedule, the updated dispatch schedule being an updated first dispatch schedule, when the one or more user and vehicle parameters exceed a threshold, wherein the updated second dispatch schedule differs from the second dispatch schedule with respect to one or more of a route followed by the second vehicle, a stop made by the second vehicle, and a door actuation performed by the second vehicle; and
sending over the network from the transport-manager computing device, by the one or more transceivers, the updated second dispatch schedule to the second vehicle computing device, the updated second dispatch schedule directing a modification of the second operation of the second vehicle based on the prioritization of the first group over the second group.

10. The method of claim 1, wherein the one or more user parameters further comprise a user location for each user.

11. The method of claim 10, wherein the one or more vehicle parameters comprise the vehicle location of each vehicle.

12. The method of claim 1, wherein the one or more user parameters comprise a quantity of users in the first group and a quantity of users in the second group.

13. The method of claim 12, wherein the one or more vehicle parameters comprise the user capacity of each vehicle and the vehicle location of each vehicle.

14. The method of claim 1, wherein the one or more user parameters further comprise a user location for each user, a quantity of users in the first group, and a quantity of users in the second group.

15. The method of claim 1, wherein the one or more vehicle parameters comprise the vehicle location of each vehicle, the user capacity of each vehicle, and the vehicle location of each vehicle.

16. The method of claim 1, further comprising:
generating the dispatch schedule using integer linear programming (ILP); or
using ILP to update the dispatch schedule; or
both, wherein the ILP comprises the one or more user and vehicle parameters.

17. The method of claim 1, wherein the one or more user parameters further comprise a fare payment level for each user.

18. The method of claim 1, further comprising displaying a map to an operator of the vehicle, through the vehicle computing device, pertaining to the dispatch schedule, the updated dispatch schedule, or both.

19. The method of claim 1, wherein the refunding comprises refunding a full amount of the fare to the user.

20. The system of claim 3, wherein the one or more processors are further configured to refund a full amount of the fare to the user.

* * * * *